United States Patent Office 2,945,741
Patented July 19, 1960

2,945,741
RECOVERY OF URANIUM VALUES

Ronald Edwin Stedman, Norton-on-Tees, England, assignor to Imperial Chemical Industries Limited, London, England, a corporation of Great Britain No Drawing. Filed Apr. 3, 1956, Ser. No. 575,708

Claims priority, application Great Britain Apr. 29, 1955

3 Claims. (Cl. 23—14.5)

This invention relates to the recovery of mineral values, and in particular to the recovery of uranium values from rock phosphate.

In Patent No. 2,926,992, dated March 1, 1960, there is described and claimed a method for the recovery of uranium values from rock phosphate comprising opening up the rock phosphate with a reactant comprising a mineral acid, neutralising the reaction mixture, precipitating from the liquid obtained therefrom a uranium salt in the presence of a filter aid, using a reducing agent as a precipitant, separating the solid mixture from the liquid, treating with a mineral acid the separated solid to dissolve the precipitated uranium salt from the filter aid, separating the solution produced and treating it by specified methods, for the precipitation of uranium values in concentrated form.

In the above-described process a reducing agent mentioned as suitable for the first mentioned precipitation of a uranium salt in the presence of a filter aid, is sodium hydrosulphite (also known as sodium dithionite). Furthermore, in the said specification it is stated that temperatures in the neighbourhood of 50° C., are satisfactory for this precipitation step.

In practice, treatment with a reducing agent such as sodium dithionite is not very efficacious if the temperature of the liquor is much above about 60° C., and even at temperatures below about 60° C., there is considerable evolution of gaseous sulphur dioxide, which is very undesirable.

When dealing with a liquid phosphatic reaction mixture in a commercial process, it is often inconvenient and an undesirable expense, to cool the liquid to a temperature of 60° C. or below. Furthermore, while solid sodium dithionite can be used, aqueous solutions of the salt are often more convenient as they may easily be prepared from reagents already available on the site where the phosphate rock is being treated. Nevertheless, when solutions of sodium dithionite are to be used, care must be exercised in their storage, as they are easily oxidised and thus lose their effectiveness as reducing agents.

The present invention provides an improved reducing agent for use in precipitating uranium values, preferably in the presence of a filter aid, from reaction mixtures obtained by opening up rock phosphate with a reactant comprising a mineral acid.

According to the present invention, in a process for the recovery of uranium values from rock phosphate which has been opened up with a reactant comprising a mineral acid, and which has been neutralised as hereinafter defined, the step of precipitating uranium values, preferably in the presence of a filter aid, by means of a reducing agent comprising a derivative of sulphoxylic acid with a compound selected from the group consisting of aliphatic aldehydes and aliphatic ketones, the said derivative also containing one member selected from the group consisting of the alkali metals, ammonium and zinc.

The sulphoxylic acid derivative reducing agents of the present invention comprise the aliphatic aldehyde sulphoxylates and the aliphatic ketone sulphoxylates of the alkali metals of ammonia and of zinc which are well-known compounds and which may be prepared, for example, by reacting a bisulphite with the desired aldehyde, which may be formaldehyde or acetaldehyde, or with acetone. Because of the ready availability of formaldehyde, the formaldehyde sulphoxylates are the preferred reducing agents.

It will be understood that with divalent zinc the derivative of sulphoxylic acid will contain two aldehyde or ketone sulphoxylate groups.

The sulphoxylate compound may be used as a solid or in aqueous solution.

The reducing agents for use according to the present invention may be prepared by any convenient method. For example, the ammonium or alkali metal formaldehyde sulphoxylate may be prepared by reacting a solution of the corresponding bisulphite with formaldehyde, the product of this reaction being reacted with zinc. The reactions involved may be represented by the following equations, where R is alkali metal or ammonium:

(1)  $R.HSO_3 + H.CHO \rightarrow R.SO_2.O.CH_2OH$ (2)  $R.SO_2.O.CH_2OH + Zn + H_2O$
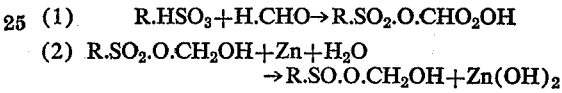
$\rightarrow R.SO.O.CH_2OH + Zn(OH)_2$ The formaldehyde sulphoxylates in solid form are stable when stored and handled under normal dry conditions, while their solutions are also reasonably stable under normal conditions.

The use of the sulphoxylates allows the above-described precipitation of uranium values to be carried out very satisfactorily at temperatures in the range from about 70° C. up to the boiling point of the reaction mixture, although lower temperatures may be used if desired, the reduction being accompanied by only insignificant evolution of sulphur dioxide, whatever temperature is used during the reduction step.

In general, the initial opening up of the rock phosphate will be dictated by the final phosphate-containing material which it is desired to produce. Thus the rock phosphate may be opened up with sulphuric acid as a step in the production of phosphoric acid to be used in the manufacture of, for example, fertilizers or detergents, or it may be opened up with hydrochloric acid or nitric acid or with mixtures of mineral acids such as of sulphuric acid with nitric acid, or it may be opened up by treatment with a liquid mixture comprising sulphuric acid containing ammonium sulphate as a step in the production of monammonium phosphate. If desired, after the opening up process, any residual solid remaining or solid produced in the reactions occurring during the opening up process, such as calcium sulphate, may be removed, for example, by filtration, centrifuging or a simple decantation process. It is desirable to open up the rock phosphate under oxidising conditions; these are already provided when nitric acid is used, but when, for example, sulphuric acid is a constituent of the reagent used for this step then it is convenient to pass a stream of air through the reaction mixture.

The reaction mixture produced by opening up the rock phosphate, either with or without removal of the solids present should then be neutralised with a suitable reactant. By "neutralisation," as used in this specification, is to be understood neutralisation to that stage at which the acidity is decreased to a value at which the reducing agent used in a subsequent step of the process is effective. In general the reducing agents to be used tend to be decomposed in strongly acid solution, and are therefore ineffective. With solutions of the type described in the example hereinafter given, the action of the reducing agent was inadequate when the pH value of the reactant mixture was increased only to 2.0. Neutralisation to pH values in the range 3.5 to 5.0 have been found satisfactory. Suitable reagents are gaseous ammonia, the hydroxides and carbonates of ammonia, the alkali and alkaline earth metals. If residual solid or solid produced during the opening up process has not previously been removed, or if such solid has been removed and further solid is produced during the neutralisation, it is now removed, for example by filtration, decantation, or centrifuging. The liquid obtained after this neutralisation and separation step is hereinafter referred to as the conditioned liquid.

A suitable quantity of a filter aid such as kieselguhr, silica, fuller's earth, or diatomaceous earth, may now be added to the conditioned liquid. The quantity of filter-aid added may vary within wide limits, but the quantity should be as small as possible compatible with satisfactory collection of the subsequently precipitated uranium compound. It will be understood that quantities much in excess of this would be an unnecessary load on the subsequent filtration step. We have found it convenient to add between 0.5 gm. to 1.0 gm. per litre of conditioned liquid. Thereafter the uranium values are precipitated from the conditioned liquid by treatment with the chosen sulphoxylate.

The solid is then filtered off and if desired, washed. The liquid obtained may be worked up to produce for example, fertilizers or detergents. Instead of filtering the whole of the slurry obtained in the precipitation step, it may be passed to a settling tank from which a part of the thickened slurry may be returned to a preceding step in the process, for example, to the step preceding precipitation, while the remainder may be passed to the filtration step.

The solid obtained by filtration is treated with a mineral acid, preferably under oxidising conditions, to dissolve the precipitated uranium values. Oxidising conditions may be provided by the presence of sulphuric acid and manganese dioxide, but it is preferable, however, to use nitric acid for this step of the process. The quantity of nitric acid used is preferably in excess of the stoichiometric proportion. The liquid is now separated from the solid filter aid which if desired may be returned to the process.

The liquid thus obtained may then be treated for the recovery of uranium values in concentrated form by one of the processes to be described in the following paragraphs.

In the first process, the liquid obtained by treating the solid containing filter aid and uranium values, is treated with an oxidising agent to precipitate hydrated uranium tetroxide. A suitable oxidising agent is hydrogen peroxide. It has been found that stirring the reaction mixture for a considerable time, say 10 to 15 hours assists in obtaining efficient precipitation. As an alternative to prolonged stirring, the hydrogen peroxide may be added in two or more batches, stirring between each addition. The precipitate of hydrated uranium tetroxide may now be filtered off and dried, whereby there is obtained a yellow solid containing the hydrated oxide. In operating this method of precipitating the uranium concentrate, it is essential to wash the precipitate comprising the filter aid and the uranium values to remove as much as possible of other phosphates which may be present in the solid, the presence of which tends to hinder the ultimate precipitation of the uranium concentrate. The filtrate from this precipitation may be returned to the process, for example, to the crude phosphate liquor, before it is treated according to the present invention. It is sometimes desirable before carrying out the precipitation step, to dilute the clear liquid and to increase its pH value, for example, to one of about 0.5. Dilution of the clear liquid with water may be sufficient to cause a satisfactory increase in the pH value, but if desired, the increase may be assisted by the addition of alkali, which preferably is aqueous ammonia. Here again, the ultimate precipitation of the uranium values is more effective when the acidity of the reactant liquid is decreased before precipitation.

As an alternative to the above-described process for the precipitation of the uranium concentrate, the clear liquid is treated to adjust its pH to a value of about 1.0 or more, whereby there is obtained a solid containing a high proportion of uranium, which we believe is a complex uranium phosphate. We have found that satisfactory precipitation is obtained if the pH value of the liquid obtained by treating the solid containing filter aid and uranium values, is adjusted with ammonia to a value of about 1.0. After adjusting the pH value with ammonia it is preferable to stir the reaction mixture for a time, for example, about two hours. It is believed that the precipitate thus obtained is uranyl ammonium phosphate ($NH_4.UO_2.PO_4$). By drying and igniting the precipitate, the concentration of uranium (expressed as $U_3O_8$), is increased considerably.

A further method for the recovery of uranium values from the solid mixture of filter aid plus uranium compounds precipitated by the action of the sulphoxylate, is to treat the solid according to the process described in co-pending U.S. application Serial No. 493,826, filed March 11, 1955, and now abandoned. Thus, the solid mixture obtained according to the process of the present invention may be subjected to an extraction treatment, in aqueous medium, with a carbonate or bicarbonate of an alkali metal, or of ammonia, after which the phosphate ion is precipitated from the resulting liquor by treatment with a cation giving rise to an insoluble phosphate, which is then separated, the resulting liquid then being treated for the recovery of the uranium values by known means. In this method of operation, it is preferable to subject the solid mixture to an oxidation treatment before the extraction step, to ensure that the uranium is in the hexavalent form. This may be achieved for example by treating the solid with an aqueous solution of the dichromate or permanganate of an alkali metal or with hydrogen peroxide. When using this method for the recovery of the uranium values, the phosphate ion may be precipitated with the magnesium, calcium or ferric ion.

*Example*

A Moroccan rock phosphate containing about one hundred parts per million of uranium, expressed as $U_3O_8$ was treated with a mixture of sulphuric acid and ammonium sulphate at 80° C., while passing a stream of air through the mixture, the proportion by weight of the various initial reactants being as follows: 264 rock phosphate, 256 of 77% sulphuric acid, 40 of ammonium sulphate and 410 of water. This water was made up from 70 parts of fresh water and 340 parts of wash water from previous operation of the process. After reaction, the precipitated calcium sulphate was filtered off, the uranium-containing filtrate passing forward for further treatment. The precipitated calcium sulphate was washed with water, the filtrate from this washing step being collected separately and reserved for use in the initial reaction step when treating another batch of rock phosphate; it was from such a washing operation that the 340 parts of water above-mentioned were obtained. Sodium silicofluoride was removed from the uranium-containing filtrate by conventional treatment and the pH value of the resulting liquor was adjusted to about 4.0 by means of ammonia gas. The liquor was then filtered to remove sludge; this is conditioned liquor. To eight litre portions of conditioned liquid, there were then added 8.0 grams of kieselguhr, and 5.2 grams of sodium formaldehyde sulphoxylate in the form of an aqueous solution. The mixture was warmed to 80° C., and stirred for an hour, and was then filtered, the solid material being retained for further treatment for the recovery of uranium values in concentrated form. A 6 gram portion of the solid was treated with 6 mls. of concentrated nitric acid and 12 mls. of water and warmed, after which the mixture was filtered, the solid being suitable for return to the process for use as a filter aid. The filtrate was then treated as follows.

The pH value of the liquid was adjusted to about 1.0 by the addition of ammonium hydroxide and the mixture stirred for two hours, whereby a yellow precipitate was obtained. This was filtered off, washed and dried at 100° C., whereby there was obtained 0.5 gram of a substance which is believed to by uranyl ammonium phosphate ($NH_4UO_2PO_4$), and which contained 57% of uranium expresed as $U_3O_8$.

I claim:

1. In a process for the recovery of uranium values from rock phosphate which has been opened up with a reactant consisting essentially of a mineral acid and in which the resulting reaction mixture has been neutralized to a pH value in the range of 3.5 to 5.0, the further and subsequent step of precipitating uranium values in the presence of an inorganic filter aid, by means of a reducing agent consisting essentially of the following compound:

$$R.SO.O.R_1.H$$

wherein R is selected from the group consisting of the alkali metals and ammonium and $R_1$ is selected from the group consisting of formaldehyde, acetaldehyde and acetone.

2. The step of precipitating uranium values as claimed in claim 1 wherein R is sodium and $R_1$ is formaldehyde.

3. The step of precipitating uranium values as claimed in claim 1 in which the temperature at which it is carried out is in the range from about 70° C. up to the boiling point of the reaction mixture.

References Cited in the file of this patent
UNITED STATES PATENTS

| | | |
|---|---|---|
| 2,743,156 | Metziger et al. | Apr. 24, 1956 |
| 2,789,879 | Kaufman | Apr. 23, 1957 |

OTHER REFERENCES

Sidgwick: "The Chemical Elements and Their Compounds," vol. II, pages 905, 906 (1950), Clarendon Press, Oxford.